US012768392B2

(12) United States Patent
Maurice et al.

(10) Patent No.: US 12,768,392 B2
(45) Date of Patent: Oct. 20, 2026

(54) CARABINER AND METHOD FOR MANUFACTURING

(71) Applicant: ZEDEL, Crolles (FR)

(72) Inventors: Alain Maurice, Saint Hilaire du Touvet (FR); Aurélie Bergez, Gières (FR)

(73) Assignee: ZEDEL, Crolles (FR)

( * ) Notice: Subject to any disclaimer, the term of this patent is extended or adjusted under 35 U.S.C. 154(b) by 1053 days.

(21) Appl. No.: 17/857,561

(22) Filed: Jul. 5, 2022

(65) Prior Publication Data

US 2023/0003249 A1 Jan. 5, 2023

(30) Foreign Application Priority Data

Jul. 3, 2021 (FR) ....................................... 2107225

(51) Int. Cl.
*F16B 45/02* (2006.01)

(52) U.S. Cl.
CPC .................................. *F16B 45/026* (2021.05)

(58) Field of Classification Search
CPC ............................. F16B 45/026; F16B 45/023
See application file for complete search history.

(56) References Cited

U.S. PATENT DOCUMENTS 3,367,001 A 2/1968 Raschke
4,811,467 A 3/1989 Lowe
4,835,823 A 6/1989 Contat
8,234,761 B2 8/2012 Gompert et al.
2003/0106190 A1* 6/2003 Christianson ......... F16B 45/026 24/600.1
2005/0246874 A1* 11/2005 Hsu ....................... F16B 45/023 24/598.2
2006/0219479 A1* 10/2006 Petzl ..................... F16B 45/029 182/3
2013/0036579 A1* 2/2013 Christianson ......... F16B 45/023 24/600.1
2018/0056134 A1* 3/2018 Chu .................. A62B 35/0037

FOREIGN PATENT DOCUMENTS

| | | | |
|---|---|---|---|
| CN | 209212760 U | 8/2019 | |
| EP | 1703148 A1 | 9/2006 | |
| EP | 1710456 A1 | 10/2006 | |
| FR | 2651684 A1 | 3/1991 | |
| FR | 2731255 A1 | 9/1996 | |
| FR | 2835578 A1 * | 8/2003 | ............ F16B 45/023 |
| JP | 2016-006342 A | 1/2016 | |

OTHER PUBLICATIONS

FR 2835578 A1 English Translation (Year: 2003).*
RS, A Complete Guide to Compression Springs, 2023, https://uk.rs-online.com/web/content/discovery/ideas-and-advice/compression-springs-guide (Year: 2023).*

* cited by examiner

*Primary Examiner* — Stephen A Vu
(74) *Attorney, Agent, or Firm* — Oliff PLC

(57) ABSTRACT

The carabiner comprises a C-shaped body (1) and a gate (2) fitted movable between an open position and a closed position. The gate (2) is fitted rotatable with respect to the body (1). The gate (2) defines a cavity (2*a*) receiving a spring (4). A pusher (5) presses on the body (1). The spring (4) installed in the cavity (2*a*) of the gate (2) presses on the gate (2) and on the pusher (5) to bias the gate (2) to the closed position. The spring (4) is a coil spring extending along the longitudinal axis of the cavity (2*a*). The spring (4) and pusher (5) are fixedly mounted on one another to form a monolithic assembly.

12 Claims, 3 Drawing Sheets

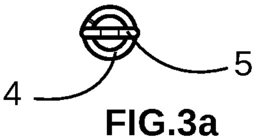
FIG.3a
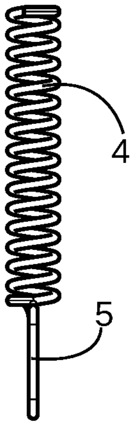
FIG.3b
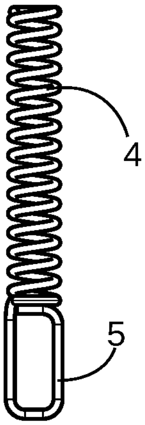
FIG.3c
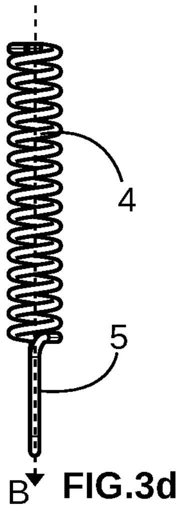
FIG.3d
FIG.3e
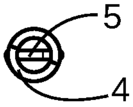
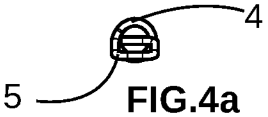
FIG.4a
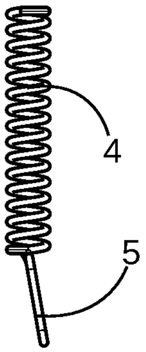
FIG.4b
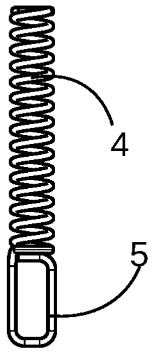
FIG.4c
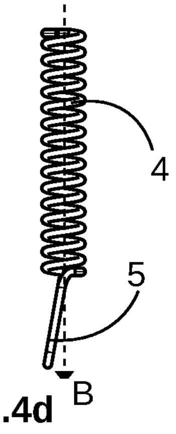
FIG.4d
FIG.4e
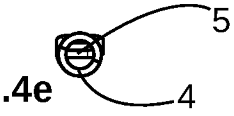

FIG 5a
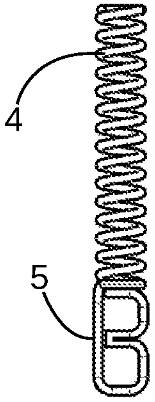
FIG 5b
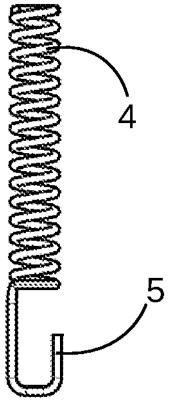
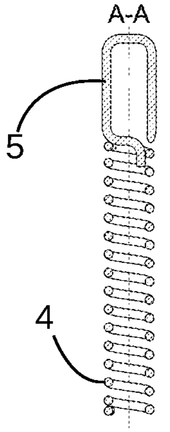
FIG.6a
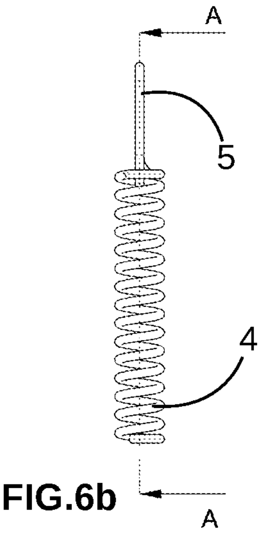
FIG.6b
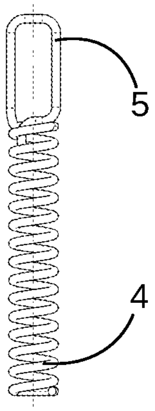
FIG.6c

CARABINER AND METHOD FOR MANUFACTURING

BACKGROUND OF THE INVENTION

The invention relates to a carabiner and to a method for manufacturing one such carabiner.

STATE OF THE ART

In the fields of working at height, caving and mountaineering, it is common practice to use carabiners having a movable gate associated with a spring. Different configurations of gates and springs are known that enable the gate and spring to be associated so that the spring moves the gate so that the carabiner is closed. The spring applies a force on the gate to bias the latter to its closed position thereby closing the carabiner.

It is known from the document U.S. Pat. No. 8,234,761 to form a gate that is openable and closable. The gate formed by a wire is elastically deformable and is prestressed to place itself against the body in the absence of any outside force. The gate is formed by a metal wire having two attachment points offset along the large axis of the carabiner to define an axis of rotation of the openable gate and a spring effect.

Another carabiner configuration is also known with a movable gate that is hollow. The spring is a coil spring installed inside the gate. The spring deforms inside the gate. One end of the spring is pressing on the inside of the gate whereas the other end is pressing on a pusher that presses on the body of the carabiner close to the axis of rotation between the gate and body. Rotation of the gate results in rotation of the pusher and compression of the spring.

Different pusher configurations are known with in particular a pin that pushes into the coil spring. In one configuration, the pusher has one end having a cross-section close to the cross-section of the cavity of the gate so as to close the cavity. Rotation of the gate with respect to the body corresponds to translation of the pusher in the cavity which applies a more or less large stress on the coil spring. The spring is configured to repel the pusher corresponding to a gate in the closed position of the carabiner. In another configuration, the pusher that closes the cavity is replaced by a rod that partially obstructs the cavity and that passes through at least a part of the coil spring to ensure a good mechanical connection between the pusher and the coil spring.

Different configurations of carabiners are illustrated in the documents EP 1710456, FR 2731255, EP 1703148, JP 2016-6342, U.S. Pat. No. 4,835,823, FR 2651684 and CN 209212760.

It is known from document U.S. Pat. No. 3,367,001 a hook that opens outward and has a hollow gate. The inside of the gate receives a coil spring that slides along the outside surface of the hook. The document U.S. Pat. No. 4,811,467 disclose a carabiner provided with a gate equipped with a pusher topped by an elastically deformable part forming a spring. The plunger and the spring are monolithic.

SUMMARY OF THE INVENTION

One object of the invention consists in remedying these shortcomings, and more particularly in providing a carabiner that ensures a better cooperation between the coil spring and the pusher while at the same time keeping an assembly formed by the spring and the pusher that is easy to install in the carabiner and that is economically viable.

These shortcomings tend to be overcome by means of a carabiner having:

- a C-shaped body,
- a gate fitted movable between an open position and a closed position, the gate being fitted movable in rotation with respect to the body, the gate defining a cavity designed to house a spring,
- a pusher pressing on the body,
- a spring installed in the cavity of the gate and pressing on the gate and on the pusher to bias the gate to the closed position, the spring being a coil spring extending along the longitudinal axis of the cavity.

The carabiner is remarkable in that the spring and pusher are fixedly mounted on one another to form a monolithic assembly.

According to one feature of the invention, the spring and pusher are formed by one and the same metal wire.

In preferential manner, the metal wire has a constant diameter from one end of the spring to the other and from one end of the pusher to the other.

Advantageously, the pusher is in the form of a ring, the spring having two pressing points on the ring.

In a particular embodiment, the support is L-shaped or U-shaped.

According to another feature, the pusher is included in a plane that contains a diameter of the spring.

It is a further object of the invention to provide a method for manufacturing a carabiner that is easier to implement than the methods of the prior art.

This result tends to be achieved by means of a method for manufacturing a carabiner comprising the following steps:

- providing a C-shaped body;
- providing a gate, the gate defining a cavity designed to house a spring;
- providing a monolithic assembly formed by the spring and a pusher that are fixedly mounted on one another, the spring being a coil spring;
- installing the monolithic assembly in the cavity, the spring being installed in the cavity of the gate, the spring extending along the longitudinal axis of the cavity;
- fitting the gate on the body in rotatable manner between an open position and a closed position, the gate being fitted movable in rotation with respect to the body, the pusher pressing on the body and the spring pressing on the gate and on the pusher to bias the gate to the closed position.

DESCRIPTION OF THE DRAWINGS

Other advantages and features will become more clearly apparent from the following description of particular embodiments and implementation modes of the invention given for non-restrictive example purposes only and represented in the appended drawings, in which:

FIGS. 3*a*, 3*b*, 3*c*, 3*d* and 3*e* schematically illustrate a front view, a right-hand side view, a left-hand side view, a bottom view and a top view of a first embodiment of an assembly formed by a spring coupled with a pusher;

FIGS. 4*a*, 4*b*, 4*c*, 4*d* and 4*e* schematically illustrate a front view, a right-hand side view, a left-hand side view, a bottom view and a top view of a second embodiment of an assembly formed by a spring coupled with a pusher;

FIGS. 5*a* and 5*b* schematically illustrate a front view of other embodiments of an assembly formed by a spring coupled with a pusher;

FIGS. 6*a*, 6*b* and 6*c* schematically illustrate yet another embodiment of an assembly formed by a spring coupled with a pusher with a front view, a side view and a cross-section.

DETAILED DESCRIPTION

Figure 1:
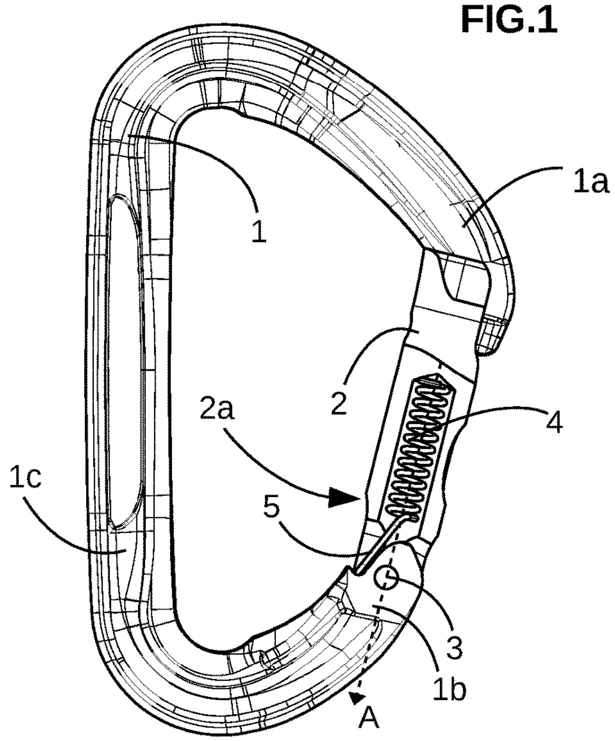
FIG. 1 schematically illustrates a cross-sectional view of a carabiner with the gate in the closed position.
Figure 2:
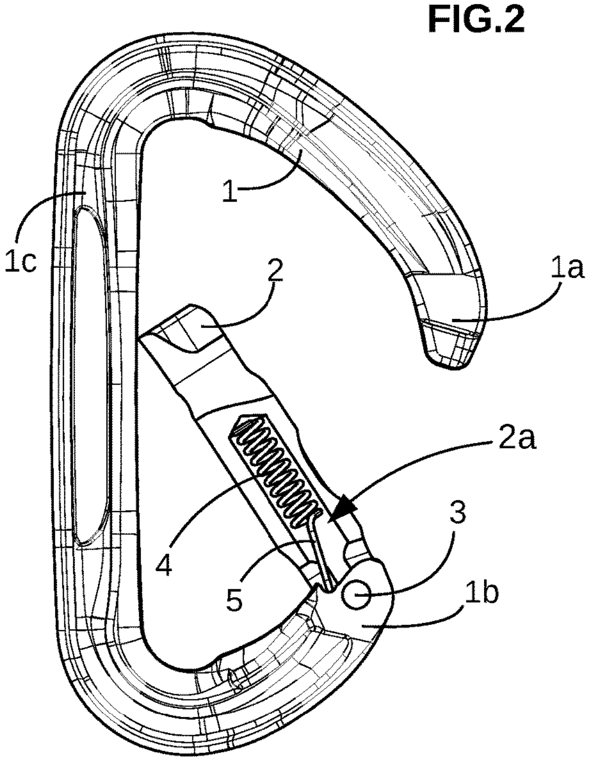
FIG. 2 schematically illustrates a cross-sectional view of a carabiner with the gate in the open position.

FIGS. 1 and 2 illustrate a cross-sectional view of a carabiner provided with a body 1, a gate 2 and a rotation shaft 3. Body 1 is C-shaped. Gate 2 is fitted movable in rotation with respect to body 1. Gate 2 is fitted rotatable around a rotation shaft 3. Gate 2 is fitted movable between a closed position (FIG. 1) and an open position (FIG. 2). In the closed position, gate 2 closes the carabiner which then defines a closed loop. In the open position, gate 2 closes the carabiner which then defines an open loop allowing a tool or a strap to be inserted.

Body 1 presents a C-shape with opposite first and second ends 1*a* and 1*b* facing one another. First end 1*a* is joined to second end 1*b* by connecting portion 1*c* which is preferentially rectilinear or substantially rectilinear. Gate 2 is fixed to second end 1*b* by means of rotation shaft 3. In the closed position, gate 2 connects first end 1*a* to second end 1*b*.

Gate 2 defines a cavity 2*a* designed to house a spring 4. The carabiner has a spring 4 and a pusher 5. Spring 4 is a coil spring the spring axis B of which is parallel or substantially parallel to the longitudinal axis A of cavity 2*a*. Spring 4 has one end that is pressing against gate 2. The coil spring extends along longitudinal axis A of cavity 2*a*. Longitudinal axis A of cavity 2*a* passes through or is in immediate proximity to the axis of gate 2 with respect to body 1. Spring 4 is formed by a plurality of non-jointed coils so as to work in compression. Spring 4 is compressed between one end of cavity 2*a* and pusher 5. The use of a coil spring is more advantageous than a flat spring known from the prior art.

Pusher 5 is pressing directly against body 1. Pusher 5 is housed in a dedicated space of body 1, for example in the form of a dish or a hook arranged in body 1 to block one end of pusher 5. Pusher 5 separates spring 4 and body 1. This configuration is more advantageous than the one illustrated in document U.S. Pat. No. 3,367,001 because the pusher can intervene in the rotation of the gate when the latter is deformed from its end wedged in the cup or the hook to the other end attached to the spring.

Rotation of gate 2 results in movement of pusher 5 which is inserted more or less deeply in cavity 2*a*. Insertion of pusher 5 into cavity 2*a* biases spring 4 which opposes this insertion. Rotation of gate 2 from the closed position to the open position results in depression of pusher 5 into cavity 2*a* and compression of spring 4.

Pusher 5 and spring 4 are installed in fixed manner on one another so as to form a single part that is inserted into cavity 2*a* when spring 4 is installed in cavity 2*a*. Mechanical fixing of pusher 5 on spring 4 enables transmission of the forces between pusher 5 and spring 4 to be defined precisely. This makes it possible to better define the behaviour of spring 4 and the behaviour of pusher 5 when rotation of gate 2 takes place.

In the prior art configurations where the pusher has one end having a substantially identical cross-section to the cross-section of the cavity, it is not possible to have a perfect complementarity between the two parts. Furthermore, to avoid introducing friction between gate 2 and pusher 5, it is sought to provide a pusher 5 with a substantially smaller cross-section than that of the cavity. Unfortunately, this configuration results in cavity 2*a* being able to retain moisture or debris when the carabiners are used in difficult conditions, for example caving or mountaineering. This may result in premature ageing of spring 4 with a modification of its mechanical behaviour.

In the prior art configurations where pusher 5 is in the form of a rod inserted between the coils of spring 4, the width of the rod must be sufficiently large to come into contact with the coils substantially over a diameter without coming into contact with the side wall of the cavity to reduce friction. As the parts as small, installation of the spring and pusher is a painstaking operation. The behaviour of gate 2 can vary depending on how spring 4 and pusher 5 are installed. Spring 4 and pusher 5 move with respect to one another. As a result of the large number of movements of gate 2 between its open position and closed position, the mechanical connection between spring 4 and pusher 5 is modified which modifies the behaviour of gate 2 with time.

It is therefore particularly advantageous to have a spring 4 and a pusher 5 that are irremediably fixed to one another so as to form an assembly whose mechanical behaviour is better mastered in particular as the carabiner is increasingly used. Mechanical fixing of spring 4 with pusher 5 enables the mechanical behaviour of the assembly formed by spring 4 and pusher 5 to be better mastered throughout rotation of gate 2 between the closed position and the open position. It is particularly advantageous to provide for the end of spring 4 in contact with pusher 5 not to be totally sealed so as to make it easier to extract ice, mud or sand which may penetrate into spring 4. Depending on the configurations, pusher 5 does not obstruct or hardly obstructs the central hole of the spring in its proximal end of pusher 5.

In a particular embodiment, fixing of spring 4 with pusher 5 defines a hinge with elastic deformation.

In an advantageous configuration, pusher 5 and spring 4 are formed by one and the same part so as to form a monolithic, and therefore inseparable, assembly.

In preferential manner, spring 4 and pusher 5 are made from metal material, preferably in the same grade of metal and even more preferentially in a single technological step so as to form an assembly whose mechanical performances are even better mastered.

In a preferred embodiment, spring 4 is formed by a wire, preferably a metal wire, forming the coil spring, and the wire that extends from spring 4 is used to form pusher 5. Advantageously, the straight section of the wire is circular. It is particularly advantageous to use a metal wire of circular cross-section which greatly reduces wear of pusher 5 and/or of body 2 in comparison with a pusher formed by a plate as illustrated in the document EP 1710456. Preferentially, the cross-section of the wire is identical between spring 4 and pusher 5, i.e. it is constant from one end of spring 4 to the other and from one end of pusher 5 to the other. It is also possible to provide pusher 5 in a wire that is thicker than the wire forming spring 4 so as to form a pusher with a reduced deformation. Preferentially, the metal wire is deformed to define spring 4 and the rest of the metal wire extending spring 4 is then deformed to form pusher 5. In an alternative embodiment, the metal wire is deformed to define pusher 5 and the rest of the metal wire extending pusher 5 is then deformed to form spring 4. The metal wire extending between spring 4 and pusher 5 results in a better mastery of the mechanical connection between these two parts and of the orientation of the pusher at the join between pusher 5 and spring 4.

Advantageously, pusher 5 is in the form of a ring. The ring can be of any shape. One end of the ring is pressing on body 1. The other end of the ring is pressing on spring 4. In a preferential configuration illustrated in FIGS. 3*a* to 4*e*, a part of the ring extends away from spring 4. The bottom coil of spring 4 is pressing on the ring of pusher 5 to limit deformation of spring 4 by flexion.

It is particularly advantageous to provide a pusher 5 that presents apertures in a direction perpendicular to the direction B. Pusher 5 can be in the form of a ring or a hook of any shape so long as it performs transmission of the compression force on spring 4 when rotation of gate 2 takes place. By using an apertured pusher 5, removal of ice and sand that may settle between body 1 and pusher 5 is easier to perform. Each time gate 2 is moved, pusher 5 moves with respect to body 1 which may give rise to rapid ageing of gate 2 and/or of pusher 5 and also a modification of the interface between gate 2 and pusher 5. The use of an apertured pusher 5 makes for a more homogeneous operation of gate 2 with time.

It is advantageous to form a pusher 5 in the form of a ring so as to limit its deformation along spring axis B thereby improving biasing of spring 4.

In a particular configuration, pusher 5 is not in the form of a ring and is for example L-shaped or U-shaped. The force take-up of the bottom coil of spring 4 is not on two distinct points of pusher 5 but on one point only. Depending on whether spring 4 presses on one point, two points or more than two points of pusher 5, it is possible to modify the mechanical behaviour of the assembly when rotation of gate 2 takes place.

In the embodiment illustrated in FIGS. 3*a* to 4*e*, pusher 5 is illustrated in the form of a rectangular ring. This shape can be modified in order to modify the mechanical behaviour of pusher 5.

FIGS. 5*a* and 5*b* illustrate different configurations of a pusher in order to modify its mechanical behaviour and therefore the mechanical behaviour of spring 4 fixed to pusher 5. FIG. 5*a* illustrates a pusher 5 with a lateral reinforcement formed by a fold of material. FIG. 5*b* illustrates a U-shaped pusher that presents a single point of contact between spring 4 and pusher 5.

FIGS. 3*a* to 3*e* illustrate a spring 4 that is a coil spring with a pusher 5 extending exclusively along a diameter of the circular cross-section of spring 4. FIGS. 3*a*, 3*b*, 3*c*, 3*d* and 3*e* respectively represent a top view, a left-hand side view, a front view, a right-hand side view and a bottom view of an embodiment of an assembly formed by spring 4 and pusher 5. As an alternative, FIGS. 4*a* to 4*e* illustrate a spring 4 that is a coil spring and that is associated with a pusher 5 defining a plane and the plane defines an angle with the direction containing the different centres of the spiral of the coil spring. FIGS. 4*a*, 4*b*, 4*c*, 4*d* and 4*e* respectively represent a top view, a left-hand side view, a front view, a right-hand side view and a bottom view of another embodiment of an assembly formed by spring 4 and pusher 5.

The incline of pusher 5 with respect to the extension direction of coil spring 4 enables the mechanical behaviour of the assembly formed by spring 4 and pusher 5 to be modified.

FIGS. 6*a*, 6*b* and 6*c* illustrate another embodiment of the assembly formed by spring 4 and pusher 5. Pusher 5 extends from spring 4 and presses on spring 4 on the portion diametrically opposite the connection between spring 4 and pusher 5. This arrangement is clearly visible in the cross-sectional view of FIG. 6*a*. It is advantageous for pusher 5 to insert itself partially inside spring 4 so as to rigidify the portion that performs the mechanical connection between spring 4 and pusher 5 thereby better mastering transmission of the forces between spring 4 and pusher 5. Such a mechanical connection between pusher 5 and spring 4 enables a more efficient closing of gate 2 to be achieved.

The carabiner can be manufactured by means of a manufacturing method that comprises:

providing a C-shaped body 1;

providing a gate 2, gate 2 defining a cavity 2*a* designed to house a spring 4;

providing a monolithic assembly formed by spring 4 and a pusher 5 that are fixedly mounted on one another, spring 4 being a coil spring;

installing the monolithic assembly in cavity 2*a*, spring 4 being installed in cavity 2*a* of gate 2, spring 4 extending along the longitudinal axis of cavity 2*a;* fitting gate 2 on body 1 in movable manner between an open position and a closed position, gate 2 being fitted movable in rotation with respect to body 1, pusher 5 pressing on body 1 and spring 4 pressing on gate 2 and on pusher 5 to bias gate 2 to the closed position.

It is possible to improve a carabiner of the prior art by replacing spring 4 and pusher 5 by an assembly formed by a spring fixedly mounted with a pusher 5 according to one of the many configurations described in the foregoing.

The invention claimed is:

1. A carabiner comprising:

a body having a C shape;

a gate mounted rotatable, with respect to the body, between an open position and a closed position, the gate moving toward a connecting portion of the body when the gate moves from the closed position to the open position, the gate defining a cavity;

a pusher and a spring, the spring and the pusher being irremediably fixed on one another to form a monolithic assembly;

the pusher pressing on the body, the pusher being fitting in a dedicated space of the body to block one end of the pusher;

the spring being installed in the cavity of the gate and pressing on the gate and on the pusher to bias the gate in rotation to the closed position, the spring being a coil spring having a spring axis extending along a longitudinal axis of the cavity.

2. The carabiner according to claim 1 wherein the spring and the pusher are formed by a single metal wire.

3. The carabiner according to claim 2 wherein the single metal wire has a circular section from the spring to the pusher and wherein the single metal wire has a constant diameter from one end of the spring to an opposite end of the spring and from one end of the pusher to an opposite end of the pusher.

4. The carabiner according to claim 2 wherein, the metal wire has a circular section in the compression spring and in the pusher.

5. The carabiner according to claim 2 wherein, when the gate moves from the closed position to the open position, the pusher inserts more deeply into the cavity.

6. The carabiner according to claim 1 wherein the coil spring define a circular cylinder and wherein the pusher is apertured when observed perpendicularly to an axis comprising centers of a plurality of turns forming the coil.

7. The carabiner according to claim 6 wherein the spring and the pusher are formed by a single metal wire, wherein the pusher and spring are connected by a single connection point and wherein the pusher is U-shaped or shaped as a hook in a direction of observation perpendicular to a longitudinal axis of the coil spring, wherein the pusher a first part of the metal wire extends from the spring in a direction parallel to the longitudinal axis of the coil spring and a second part of the metal wire extends perpendicularly to a longitudinal axis of the coil spring, the second part being separated from the spring by the first part, the second part pressing on the body.

8. The carabiner according to claim 6 wherein the pusher is included in a plane that contains a diameter of the spring.

9. The carabiner according to claim 1 wherein the pusher is different from a coil spring.

10. The carabiner according to claim 1 wherein, the metal wire has a circular section larger in the pusher than a circular section in the spring.

11. A carabiner comprising:

a body having a C shape;

a gate mounted rotatable, with respect to the body, between an open position and a closed position, the gate moving toward a connecting portion of the body when the gate moves from the closed position to the open position, the gate defining a cavity;

a pusher and a spring, the spring and the pusher being irremediably fixed on one another to form a monolithic assembly;

the pusher pressing on the body, the pusher being fitting in a dedicated space of the body to block one end of the pusher;

the spring being installed in the cavity of the gate and pressing on the gate and on the pusher to bias the gate in rotation to the closed position, the spring being a coil spring having a spring axis extending along a longitudinal axis of the cavity;

wherein the pusher is in the form of a ring, the spring having two pressing points on the ring.

12. A method for manufacturing a carabiner comprising the following steps:

providing a C-shaped body;

providing a gate rotatably mounted, relative to the body, between an open position and a closed position, the gate moving toward a connecting portion of the body when a movement of the gate from the closed position to the open position takes place, the gate defining a cavity designed to house a spring;

providing a monolithic assembly formed by the spring and a pusher that are irremediably fixed to one another, the spring being a coil spring;

installing the monolithic assembly in the cavity, the spring being installed in the cavity of the gate, the spring extending along a longitudinal axis of the cavity, the pusher pressing on the body, the pusher being housed in a dedicated space of the body to block one end of the pusher, the assembly urging the finger in rotation towards the closed position.

* * * * *